United States Patent
Hancock et al.

(10) Patent No.: US 10,173,136 B1
(45) Date of Patent: Jan. 8, 2019

(54) METHODS AND SYSTEMS FOR GAMIFICATION

(71) Applicant: UIPCO, LLC, San Antonio, TX (US)

(72) Inventors: David Hancock, Plano, TX (US); Sharon M. Sirizzotti, Helotes, TX (US); Joe R. Martin, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 15/466,379

(22) Filed: Mar. 22, 2017

Related U.S. Application Data

(60) Provisional application No. 62/312,052, filed on Mar. 23, 2016.

(51) Int. Cl.
| | |
|---|---|
| *A63F 13/00* | (2014.01) |
| *A63F 13/493* | (2014.01) |
| *A63F 13/35* | (2014.01) |
| *A63F 13/79* | (2014.01) |

(52) U.S. Cl.
CPC ............ *A63F 13/493* (2014.09); *A63F 13/35* (2014.09); *A63F 13/79* (2014.09)

(58) Field of Classification Search
CPC ...................................................... G07F 17/32
See application file for complete search history.

(56) References Cited

U.S. PATENT DOCUMENTS

| | | | |
|---|---|---|---|
| 2009/0104968 A1* | 4/2009 | Englman | G07F 17/32 463/20 |
| 2009/0327077 A1* | 12/2009 | Kim | G06Q 30/02 705/14.53 |
| 2014/0342833 A1* | 10/2014 | Robbins | G07F 17/3225 463/42 |

* cited by examiner

*Primary Examiner* — Reginald Renwick
(74) *Attorney, Agent, or Firm* — Perkins Coie LLP

(57) ABSTRACT

Methods and systems described in this disclosure are directed at gamification. In some embodiments, the present disclosure relates to methods and systems for tracking actions taken by a user at predetermined gaming levels in a gaming application, the gaming application also facilitating users to interact with the gaming application in the form of questions and answers relating to topics in the military and armed forces. If the user is unable to provide a minimum number of correct responses to the questions presented, the gaming application displays actions that are to be performed by the user to continue playing the game. In some embodiments, a game is paused temporarily by a pause signal sent to the gaming application. The game resumes when a resume signal is sent to activate the gaming application.

17 Claims, 17 Drawing Sheets

METHODS AND SYSTEMS FOR GAMIFICATION

CROSS-REFERENCE TO RELATED APPLICATIONS

This application is a non-provisional of and claims priority to U.S. Provisional Application No. 62/312,052, filed on Mar. 23, 2016, entitled "METHODS AND SYSTEMS FOR GAMIFICATION," which is hereby incorporated by reference in its entirety for all purposes.

TECHNICAL FIELD

Various embodiments of the present disclosure relate generally to gamification. More specifically, various embodiments of the present disclosure relate to methods and systems for facilitating education using a question and answer format and tracking actions taken by a user at predetermined gaming levels in a gaming application.

BACKGROUND

When a person is deciding whether to join the military or armed forces, the person may have limited knowledge of the military and armed forces, leading to less of a likelihood that the person will join. Furthermore, even if such information is provided, the information may not be shared in an interactive format, which can result in poor retention of the information.

BRIEF DESCRIPTION OF THE DRAWINGS

Embodiments of the present disclosure will be described and explained through the use of the accompanying drawings in which.

DETAILED DESCRIPTION

Figure 1:
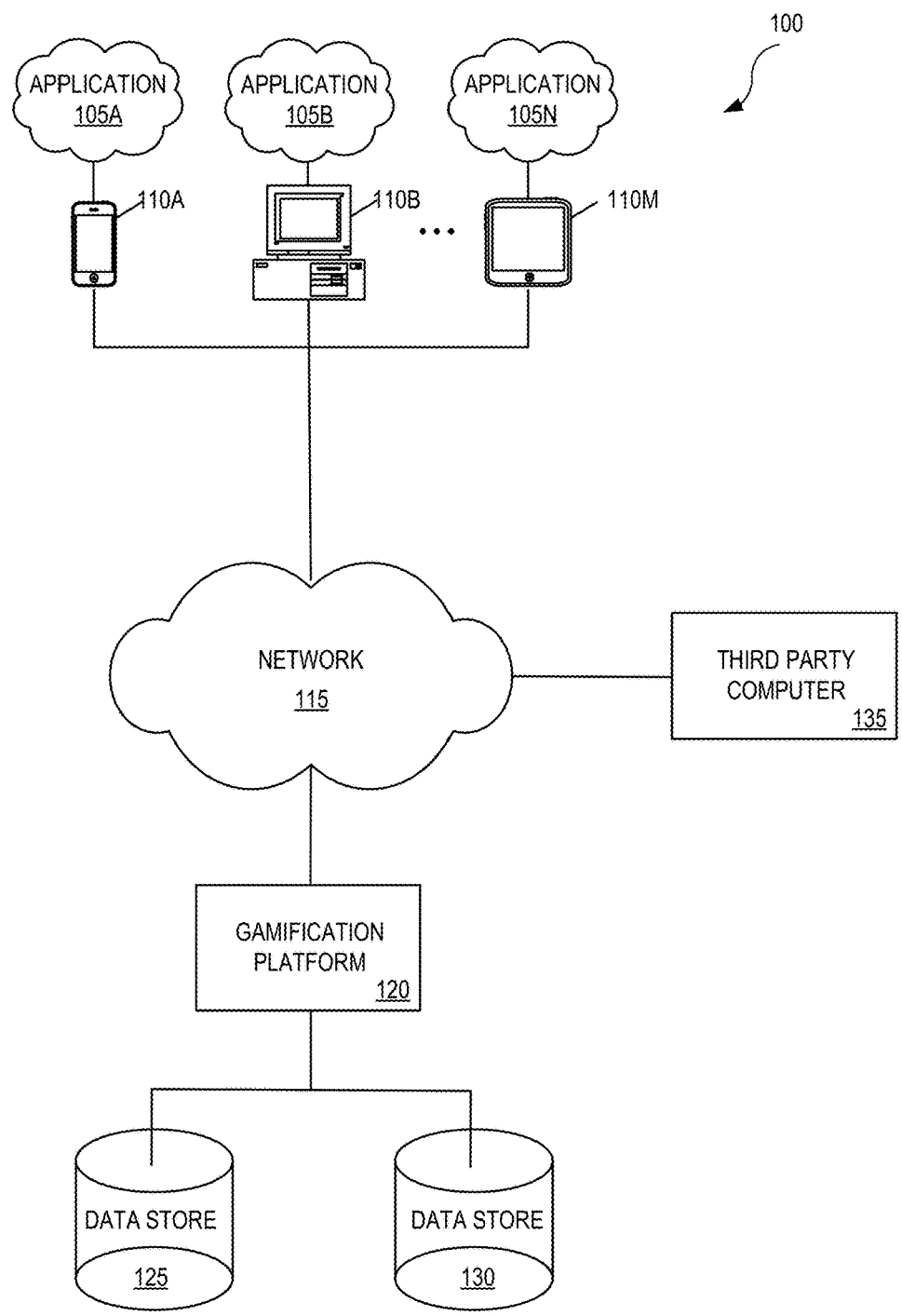
FIG. 1 illustrates an example of a network-based operating environment in accordance with various embodiments of the present disclosure.

Various embodiments of the present disclosure relate generally to gamification involving a gaming application (e.g., running on a user's device) associated with a game. The game allows users to create avatars designed to simulate the various branches of the military. Users interested in employment in the military may have limited knowledge of the military, leading to less likelihood that the user will join the military. Additionally, information provided to the user in making the decision may not be retained effectively because the information may not be interactively presented to users. Thus, embodiments disclosed herein provide methods and systems to facilitate an engaging experience for users while providing them knowledge about the military and armed forces in an interactive manner involving questions and answers. The questions presented to users can be asked by a gaming application at predetermined gaming levels by pausing the game.

According to disclosed embodiments, users can go on quests, missions, or challenges that include predetermined gaming levels. In some embodiments, the gaming application presents users with questions and evaluates the responses from the users at one or more predetermined gaming levels in the game. In some embodiments, the questions can be topics related to the military and armed forces. For example, if a user has reached (or conversely, not reached) a certain predetermined gaming level in the game, the gaming application presents the user with a set of questions (e.g., multiple choice, fill-in-the-blank, open-ended) which the user is supposed to answer. Examples of questions can include: "What is the youngest branch of the military—Air Force, Army, Navy, or Marines?"; "What is the highest enlisted rank in the Marines—Sergeant Major, Chief Master Sergeant, Master Chief Petty Officer, or Gunnery Sergeant?"; "Who was the first 5-star general—George C. Marshall, Douglas MacArthur, Dwight Eisenhower, or George Patton?"; "What year was the Battle of Thermopylae fought—480 B.C., 50 B.C., 1492, or 1776?"; "How many pushups does an 18-year old female have to do to pass the Navy PT test—19, 33, 6, or 57?" The questions associated with the gaming application can be initially transmitted by the disclosed system and then saved in a memory or a database associated with the gaming application. In some embodiments, these questions are transmitted on-the-fly (i.e., in real-time or near real-time) by the disclosed system to the gaming application.

Upon answering at least a certain number of questions correctly, the user is advanced to a next level in the game. Thus, embodiments of the present disclosure can educate a user on various military-related information and/or third party-related information as the user progresses through various gaming levels associated with missions or quests. To continue playing the game, the user has to not only engage with the game but also respond to questions that are presented to the user.

In some embodiments, should the user answer a certain number of questions incorrectly or otherwise "run out of lives" such that the game is paused and/or stopped, the user can continue playing the game by taking some type of required action (e.g., watch/listen to/read multimedia content such as a video, audio recording, or text file; sign up for a service; invite a friend to download an application or join the game; deposit money into a savings or retirement account). User actions on the device can be monitored or tracked to ensure the action is taken before the game resumes.

The gaming application may display the required actions, and such required actions may be hosted by a third party computer (e.g., bank, financial institution, insurance provider). Actions or tasks to continue playing the game can be varied. For example, the gaming application can display a clickable link, and, upon the user's selecting the clickable link and viewing the multimedia content or performing another required action, the user can resume playing the game. In some embodiments, the third party computer informs the disclosed system that the user has completed the trackable action. This information can be passed to the gaming application, allowing the user to continue playing the game. Thus, the disclosure herein provides functionalities for tracking user interactions and engagements, not only within a gaming application, but also external to a gaming application and associated with one or more third parties. In other embodiments, the gaming application and/or the disclosed system determines whether the user has completed the action.

The multimedia content associated with an action can be used to inform the user about a variety of topics such as the military, savings, retirement, and investing. Moreover, in some embodiments, the user may be required to transfer some money into a savings account or to pay a bill to keep playing the game. Thus, the gaming application can be used not only to educate users about the military or financial topics, but also to help them take concrete steps towards one or more goals. In some embodiments, the clickable link can pertain to a third party computer such as a bank, a financial institution, or insurance provider. In some embodiments, users can be tasked with capturing a video/image and uploading the video/image to the gaming application.

In some embodiments, the gaming application can include military-related questions and answers, in lieu of or in combination with a game. These questions can be transmitted by a remote server in a batch to the gaming application. The batch can be transmitted at any time (i.e., regardless of whether the user is playing a game or not). When the questions are loaded to the gaming application, the game has flexibility in asking questions. For example, a user can be prompted to enter a word that represents a topic or a famous veteran in the military at predetermined gaming levels in the game. The gaming application can then pause the game and present questions related to the word entered by the user.

The game may be used to determine a recommended branch of the military for the user to join. For example, a user can be presented with an image, followed by a series of questions. Based on the user's responses to the questions, the gaming application can recommend one or more particular branches in the military for the user to join.

The gaming application can further determine an avatar most suited for the user. For example, the user can be presented with facts about a topic or a famous personnel/veteran in the military, in lieu of or in combination with the questions. In some embodiments, the questions can include topics related to the user's personal life, for example, a kind of car he or she drives, his or her preferences for a certain type of transportation or vehicle, and the like. In a further example, the gaming application may ask for user preferences such as a selection of rank and branch affiliation. The gaming application may further ask the user's true military status (e.g., considering, enlisted, retired). Based on the user's responses, the gaming application can identify one or more famous military personnel/veterans that the user is similar to, inform the user of the famous military personnel/veterans, and provide additional details about them. In some embodiments, a user can select an avatar in the game representing one of the famous military personnel/veterans that the user is similar to.

In some embodiments, the gaming application can incentivize users with rewards or points for correctly responding to a predetermined number of questions, for reaching a certain gaming level, or a combination of the above. These rewards (e.g., trading cards) can be used to purchase avatars, skins, armory items, weaponry, or outfits worn by the avatars in the game. In some embodiments, users can continue to a next level or earn points (e.g., lives, armory items, or ammunitions associated with a mission in the game) by correctly answering a predetermined number of questions. The interactive nature of the game with questions can incentivize users to stay engaged and entertained while gaining knowledge about the military and armed forces (or other topics).

In some embodiments, users can earn rewards upon completing an action or a task such as watching a video or reading an article hosted by a third party computer. Completion of the task may allow the user to continue playing the game as well as assist users in gaining knowledge relating to a third party (e.g., an insurance provider's plans and policies, financial readiness tools, retirement planning tools, recommendations for investing and associated financial instruments or services offered by a financial services company).

In some embodiments, the disclosed system and the gaming application can provide a knowledge-gathering experience that is, in some cases, specific to the particular user. Users (e.g., persons who have not yet enlisted in the military but are considering joining it, as well as persons who are already enlisted in or retired from the military) can be categorized based on their employment status in the military, their age, demographics, financial goals, marital status, educational qualifications, and the like. For example, a third party computer can provide a budgeting tool to users based on their (current and/or future) income and savings. Or, the third party computer can inform users about pay grades associated with various ranks in the military and can include a pay calculator based on a user's selected location, rank, and number of years served in the military. In a further example, the questions and answers can inform users who have enlisted and are about to join the military, information (e.g., via a graphically illustrative timeline of events) related to the specific branch they would be joining, associated ranks, and various details about the military that they should be aware of.

In some embodiments, the game, including the questions, played by a user can be based on his or her category and/or skill level. The system can dynamically adjust the questions presented to a user based on his or her aptitude level in the game, the number of correct responses, or the user category. A certain category of user might have the opportunity to play a game that is more challenging or has a greater number of gaming levels than a user in a different category. The information needed to categorize the user can be received by the system as registration information when the user registers with the gaming application.

In some embodiments, users can play the game on one or more devices (e.g., a mobile phone, a wearable device, a virtual reality device, a tablet computer). Information relating to users reaching (or not reaching) predetermined levels in the game can be communicated by the gaming application to a remote platform (e.g., a server). In some embodiments, the remote platform can communicate a pause signal to the gaming application to pause the game until the user correctly answers a predetermined number of questions or reaches a predetermined gaming level. Upon receiving the pause signal, the gaming application can pause the progress of the game. The game is paused to present users with one or more questions relating to the military or armed forces.

In some embodiments, the gaming application informs the remote server of the number of correctly answered questions by the user. Based upon the number of correct responses, the remote server and/or the gaming application can pause the game and recommend actions that are to be performed by the user to continue playing the game. In some embodiments, the gaming application informs the remote server of real-time (or near real-time) interactions of the user with the game. In other embodiments, the gaming application informs the remote server intermittently, for example, upon detecting that the user has reached a predetermined gaming level. According to embodiments disclosed herein, the game can be paused by the gaming application and/or the remote server. Additionally, the game can be resumed by the gaming application and/or the remote server. The pausing and the resuming are based on electronic signals communicated by the remote server and the gaming application.

In some embodiments, the gaming application may not require users to take actions to continue playing the game. In such embodiments, the gaming application includes an automated timer that can be set to a predetermined time duration. A quest or a mission in a game played by a user can be paused by the gaming application, upon the user reaching a predetermined gaming level. After the predetermined time duration expires, a user can resume playing the mission in the game. In some embodiments, the automated timer is activated when a user fails to correctly respond to a minimum number of questions. The activation of the timer also triggers the game played by the user to be paused temporarily. After the predetermined time duration expires, the user can resume playing the game.

In some embodiments, a user can invite others users to play a game with him or her. In some embodiments, the gaming application allows a user to publish his or her avatar, achievements, levels and scores in the game on the user's page on a social media application. In some embodiments, a user can trade rewards or trading cards with other users.

The terms "gaming application" and "game" used herein are non-limiting and have broader interpretation. For example, in some embodiments, a gaming application and a game can be synonymous. In some embodiments, a gaming application can include a game as a feature. In the following description, for the purposes of explanation, numerous specific details are set forth in order to provide a thorough understanding of embodiments of the present disclosure. However, it will be apparent to one skilled in the art on reading the disclosure that embodiments may be practiced without some of these specific details.

This disclosure describes a gaming application that language that facilitates knowledge of the military and armed forces in an interactive format. Various embodiments may provide the following technological improvements: (1) an interactive gaming platform, (2) interoperability between various platforms, and (3) an effective use of various computing techniques during the game to obtain information from and provide information to users.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110M (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; etc.). In some embodiments, applications 105A-105N may be stored on one or more computing devices 110A-110M or may be stored remotely on a server (in the "cloud"). These computing devices can include mechanisms for receiving and sending traffic by connecting through network 115 to gamification platform 120 and data stores 125 and 130.

Computing devices 110A-110M may be configured to communicate via the network 115 with gamification platform 120. In some embodiments, computing devices 110A-110M can retrieve or submit information to gamification platform 120 and run one or more applications with customized content retrieved by gamification platform 120 and data stores 125 and 130. For example, computing devices 110A-110M can execute a browser application or a customized client application to enable interaction between the computing devices 110A-110M, gamification platform 120, third party computer 135, and data stores 125 and 130. In some embodiments, gamification platform 120 can be a server located remotely from the electronic devices.

Gamification platform 120 can be running on one or more servers and can be used to facilitate users in playing games on computing devices 110A-110M, tracking actions performed by users at third party computers 135, and/or performing other activities. In some embodiments, gamification platform 120 can send a pause signal to a gaming application on a device associated with a user to pause the progress of a game, or a resume signal to resume the progress of a paused game.

Third party computer 135 stores clickable links and application programs associated with third parties (e.g., banks, financial institutions, insurance providers) that allow users to complete actions. For example, third party computer 135 can store media (e.g., videos, text files) or access to accounts that the user may need to access to continue playing the game. When an action is completed by the user, third party computer 135 may communicate with gamification platform 120 or the gaming application directly to allow the user to continue to play the game.

Network 115 can be any combination of local area and/or wide area networks, using wired and/or wireless communication systems. Network 115 can be, or could use, any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

Data stores 125 and 130 can be used to manage storage and access to user data such as user profiles; users' game-related information; users' financial and personal data; data related to actions completed or to be completed by a user; data received from third parties; data related to users' categories; questions and answers presented to users before, during, or after a game; and other information. Data stores 125 and 130 may be a data repository of a set of integrated objects that are modeled using classes defined in database schemas. Data stores 125 and 130 may further include flat files that can store data. Gamification platform 120 and/or other servers may collect and/or access data from the data stores 125 and 130. Information provided by users can be stored in data stores 125 and 130.

Figure 2:
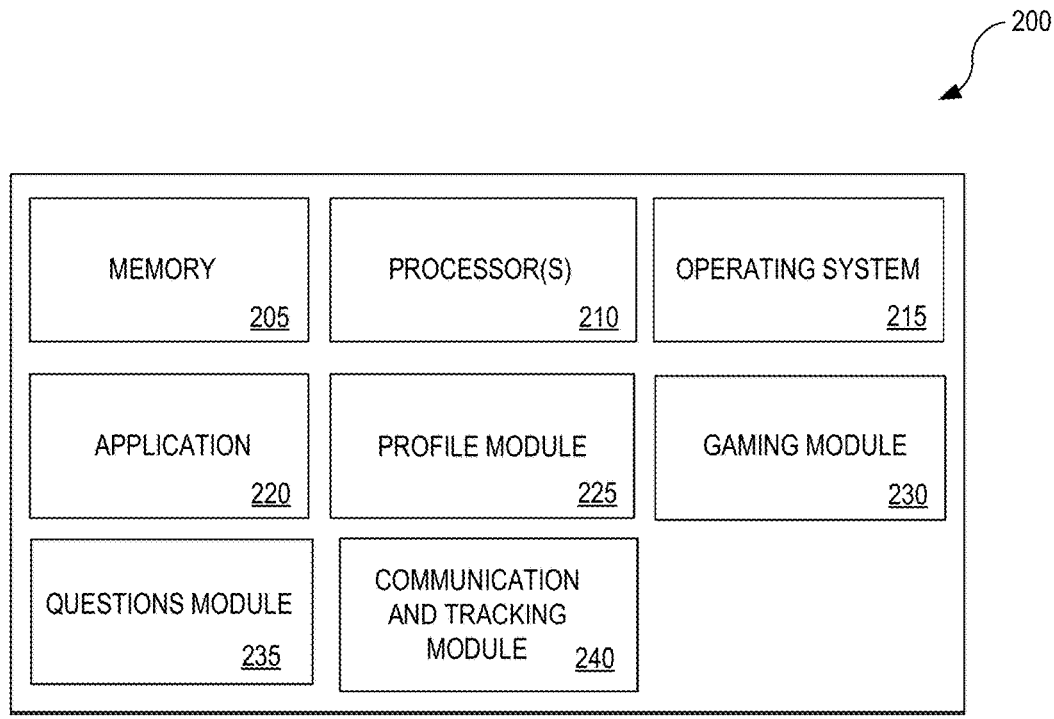
FIG. 2 illustrates various components of a mobile computing device that may be used in accordance with various embodiments of the present disclosure.

FIG. 2 illustrates a set of components 200 within computing device 110 according to one or more embodiments of the present disclosure. The computing devices 110A-110M of user(s) can be used by users to play a game via a gaming application running on the computing device. According to the embodiments shown in FIG. 2, a computing device can include memory 205, one or more processors 210, operating system 215, application 220, profile module 225, gaming module 230, questions module 235, and communication and tracking module 240. Other embodiments of the present invention may include some, all, or none of these modules and components, along with other modules, applications, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of operating system 215, application 220, profile module 225, gaming module 230, questions module 235, and communication and tracking module 240. Generally, memory 205 can include any device, mechanism, or populated data structure used for storing information. In accordance with some embodiments of the present disclosure, memory 205 can encompass, but is not limited to, any type of volatile memory, nonvolatile memory (RAM), and dynamic memory. For example, memory 205 can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with gamification platform 120. For example, application 220 can include an application for financial services, a money transfer application, a social networking application, and a banking application.

Application 220 can access a server and/or a platform associated with an organization to execute banking transactions, such as transferring funds, checking available balances in financial accounts, checking credit or debit activities associated with financial accounts, and the like. Application 220 can, for example, be associated with a bank or a financial institution or an insurance provider. In some embodiments, the disclosed gaming application can display clickable links that, when clicked by the user, launch application 220 in the user's computing device.

Profile module 225 can maintain personal and financial profiles for a user, including information relating to a gaming application. Personal data of a user can include a name, an address, a phone number, an email, a unique identification number identifying a user, a photograph of the user, and login credentials such as a username and password for launching an application. Profiles may include a user's personal data; bank/financial institution data; credit card/debit card data, including electronic wallet identification information; details of gaming levels that the user has reached (or not reached); insurance policies that the user has purchased; a category that the user belongs to; a user's preferences for specific armory items, avatars, skins, or weaponry in a game; a user's preference for famous personnel/veterans in the military; one or more famous personnel/veterans in the military resembling the user's personality; a number of correct (or, incorrect) responses to questions asked to the user; a preference of the user for a particular branch of the military; or any other information that can be used to identify a user. Profile module 225 can receive information from the gamification platform 120 that assigns a user to a user category. Additionally, profile module 225 can continually update the stored profile as the user plays games, progresses through different gaming levels, answers questions, or more generally continues to interact with the gaming application.

Gaming module 230 can generate graphical user interfaces (GUIs) that facilitate a user to play games via the gaming application. The games can be played by only one user, or a user can compete with other users. In playing the game, users can go on quests, missions, or challenges that include predetermined gaming levels. Embodiments of the present disclosure can educate a user with various military-related information and/or third party-related information as the user progresses through various gaming levels associated with missions or quests in a game. A quest or a mission in a game played by a user can be paused by the gaming application upon the user reaching a predetermined gaming level. The pause can be triggered in response to the gaming application receiving a pause signal from gamification platform 120 for temporarily halting the progress of the gaming application. To continue playing the game, the user may be required to respond to questions that are presented to the user. The questions can be based on a category or preference of the user, as stored in profile module 225.

In some embodiments, gaming module 230 allows users to purchase avatars, skins, armory items, weaponry, or outfits worn by the avatars in the game. In some embodiments, the users can continue to a next level or earn points (e.g., lives, armory items, or ammunitions associated with a mission in the game) by correctly answering a predetermined number of questions. In some embodiments, gaming module 230 receives a resume signal (e.g., for activation of the gaming application) from gamification platform 120 after a game (e.g., a quest or a mission) is paused. In some embodiments, resuming a game occurs upon expiry of a predetermined time duration counted by an automated timer associated with the gaming module. In some embodiments, resuming a game is in response to the user answering a minimum number of questions correctly. In some embodiments, if a user is unable to correctly answer a minimum number of questions, gaming module 230 can not only pause the game but can additionally prompt the user to complete one or more actions. Examples of such actions can include a user viewing a multimedia content on a server (e.g., hosted by a third party or by gamification platform 120). Gaming module 230 can receive online clickable links relating to user actions to be completed (e.g., a link hosting a video that the user has to view to complete the action) from gamification platform 120, third party computer 135, or other application programs running on the user's computing device.

Questions module 235 receives (e.g., from gamification platform 120), stores, and presents questions and answers in connection with the gaming application. The questions can relate to one or more topics in the military or armed forces. In some embodiments, the questions can be personal questions customized to the user based on a user category or an aptitude level of the user. Thus, gaming module 235 can dynamically adjust the questions presented to a user based on the user's aptitude level in the game, the number of correct responses, and/or the user category in which the user belongs. In some embodiments, questions module 235 receives questions from one or more third party computers 135.

Communication and tracking module 240 facilitates communication between the gaming application and gamification platform 120 via wireless communication methods such as cellular communication, near field communication (NFC), Bluetooth, and Wi-Fi. In some embodiments, communication module 235 can receive and/or transmit questions, game plays, and game-related data such as avatars, skins, and armory items used in a game, from gamification platform 120.

Communication and tracking module 240 can also track actions of a user. For example, communication and tracking module 240 can detect if the user has clicked on a clickable link (e.g., displayed by gaming module 230). In some embodiments, communication and tracking module 240 can receive verification information (e.g., an indication) from gamification platform 120 informing the gaming application that the user has completed the prompted actions (e.g., watched a video at the clickable link).

Figure 3:
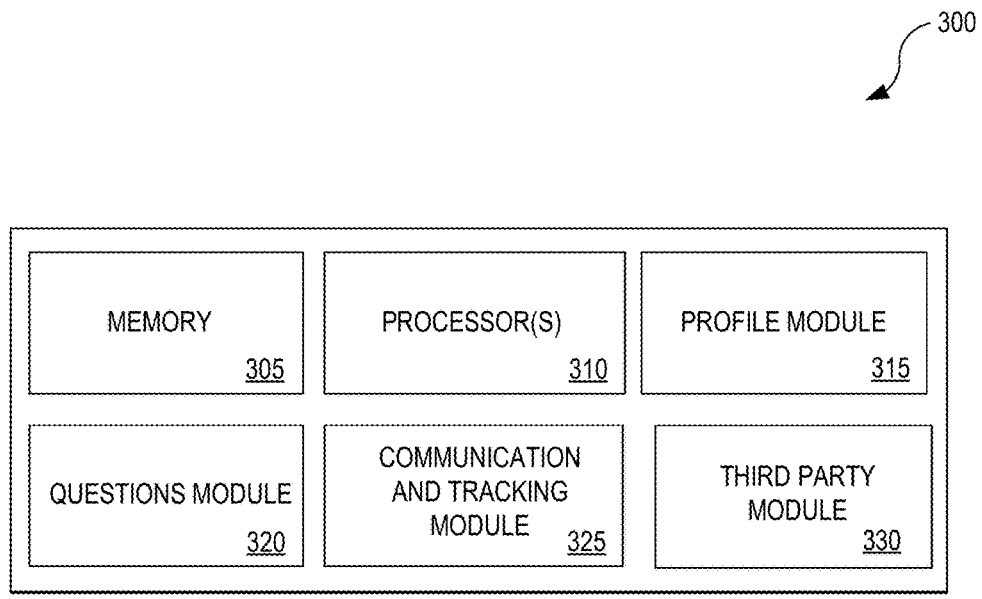
FIG. 3 illustrates various components of a gamification platform that may be used in accordance with various embodiments of the present disclosure.

FIG. 3 illustrates a set of components 300 within a system such as gamification platform 120 according to one or more embodiments of the present disclosure. In some embodiments, these components can be included in a server maintained by the entity that owns and operates gamification platform 120. According to the embodiments shown in FIG. 3, gamification platform 120 can include memory 305, one or more processors 310, profile module 315, questions module 320, communication and tracking module 325, and third party module 330. Other embodiments of the present invention may include some, all, or none of these modules and components along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information, as described above for memory 205. Memory 305 can store instructions for running one or more applications or modules on processor(s) 310. For example, memory 305 could be used in one or more embodiments to house all or some of the instructions needed to execute the functionality of profile module 315, questions module 320, and communication and tracking module 325.

Profile module 315 can maintain profiles for users that reflect the personal and financial profiles of the users, similar to the profiles described with respect to profile module 225. Profile module 315 also receives, from the gaming application, information relating to interactions of a user with the gaming application and user-related information (e.g., registration information and a user's game-related data) provided by the gaming application. In some embodiments, profile module 315 uses registration information provided by users to categorize users and create profiles of users.

Questions module 320 can maintain and create question and answer pool(s) for users, similar to the questions and answers described with respect to the questions module 235.

Communication and tracking module 325 facilitates communication with users' electronic devices. For example, communication and tracking module 325 can communicate questions and answers (e.g., provided by the questions module 320), and various types of signals associated with the gaming application. Examples of such signals can be a pause signal to a gaming application running on a user's device to cause a temporary halt in the progress of the gaming application, or a resume/activation signal to resume the gaming application from the pause. The pause signal can be communicated when a user has reached a predetermined gaming level in the game, or when the user has provided a predetermined number of incorrect responses to the questions asked by the gaming application. A resume signal can be communicated when a user has correctly answered a predetermined number of questions.

Communication and tracking module 325 can also communicate the questions and answers to the gaming application to be presented to a user. In some embodiments, communication and tracking module 325 tracks the actions that are taken/performed by the user. Such actions can be performed by the user at a third party computer. For example, a third party computer can detect that a user has completed one or more actions and communication, and tracking module 325 can receive a communication from the third party computer to remove the pause signal in a temporarily halted game of the user. Communication and tracking module 325 can send a resume signal to the user device. The detection can be based on verification information received from a third party computer that the user has completed the one or more actions. In some embodiments, certain verification information can be conveyed to the gaming application as an indication that the user has completed the one or more actions, for example, that the user has selected a clickable link at the third party computer.

Third party module 330 stores profiles of third parties, clickable links and application programs associated with the third parties that facilitate users to complete actions. Third party module 330 can be continually updated with new data and programs as new actions are added to the system, or new third parties are added.

Figure 4:
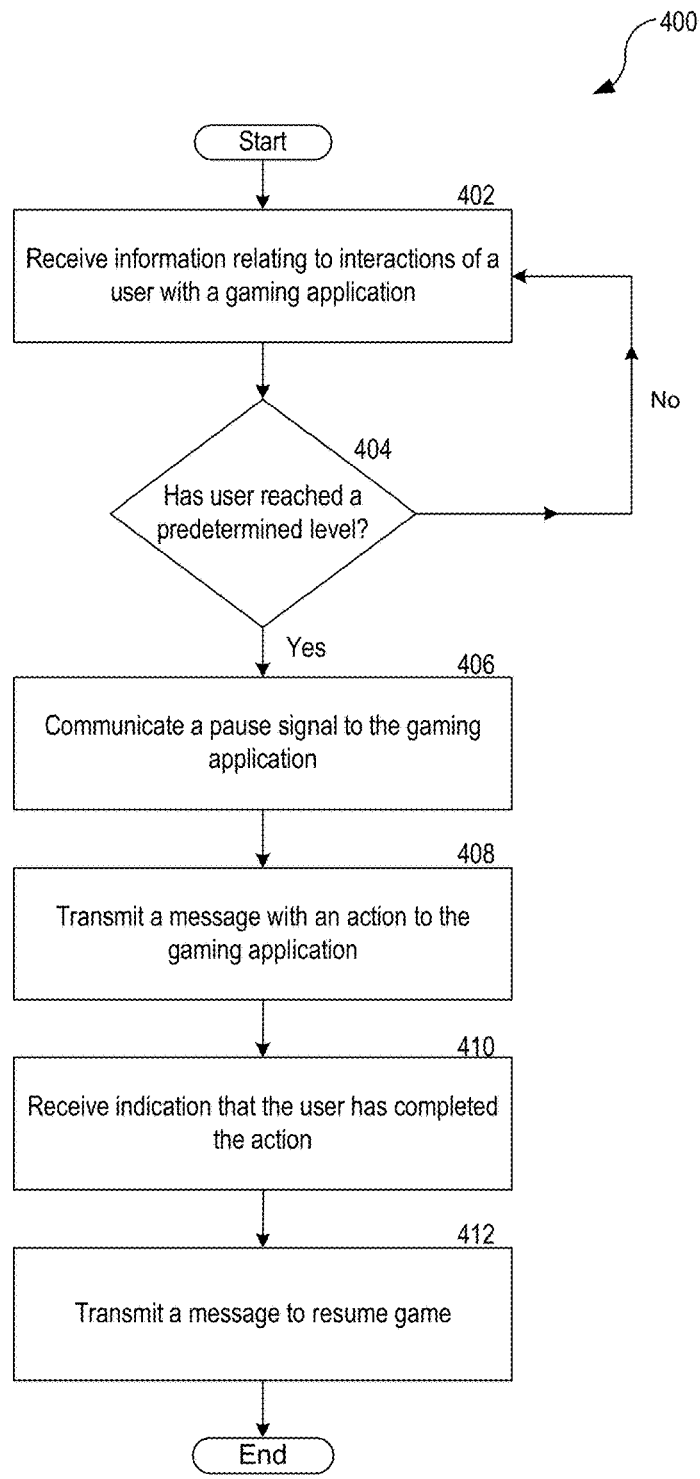
FIG. 4 is a flowchart illustrating a set of operations in accordance with various embodiments of the present disclosure.
Figure 5:
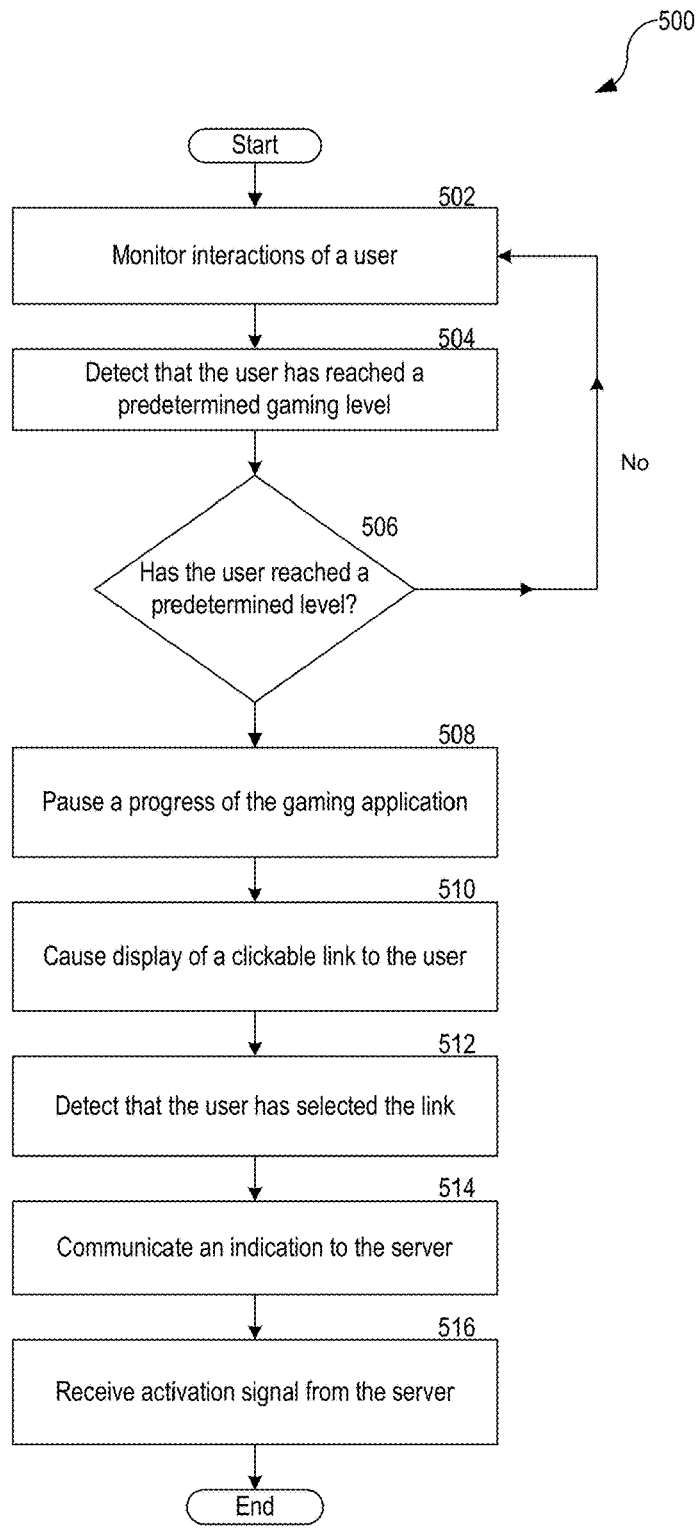
FIG. 5 is a flowchart illustrating a set of operations of a mobile computing device associated with the gamification platform in accordance with various embodiments of the present disclosure.
Figure 6:
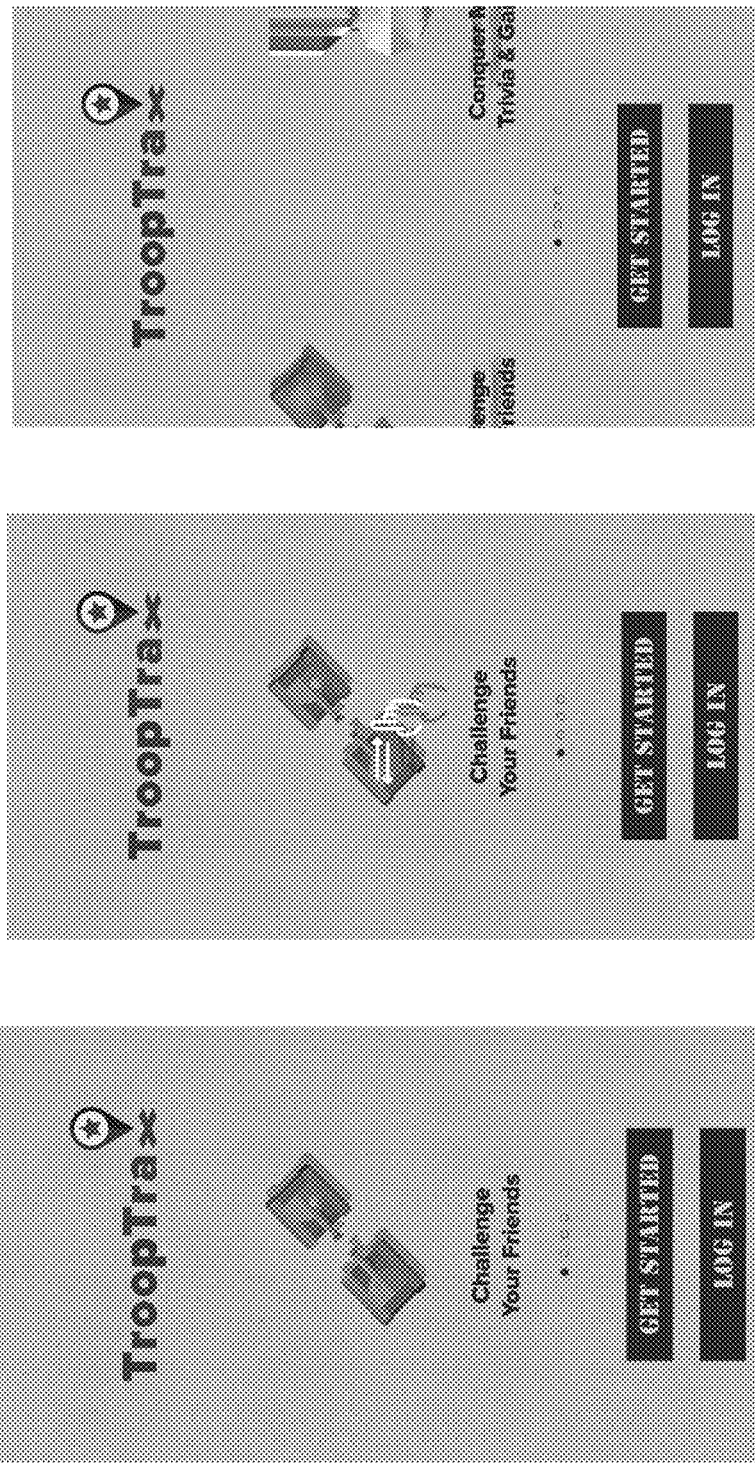
FIGS. 6-16 depict various screenshots of a gaming application in accordance with various embodiments of the present disclosure.
Figure 7:
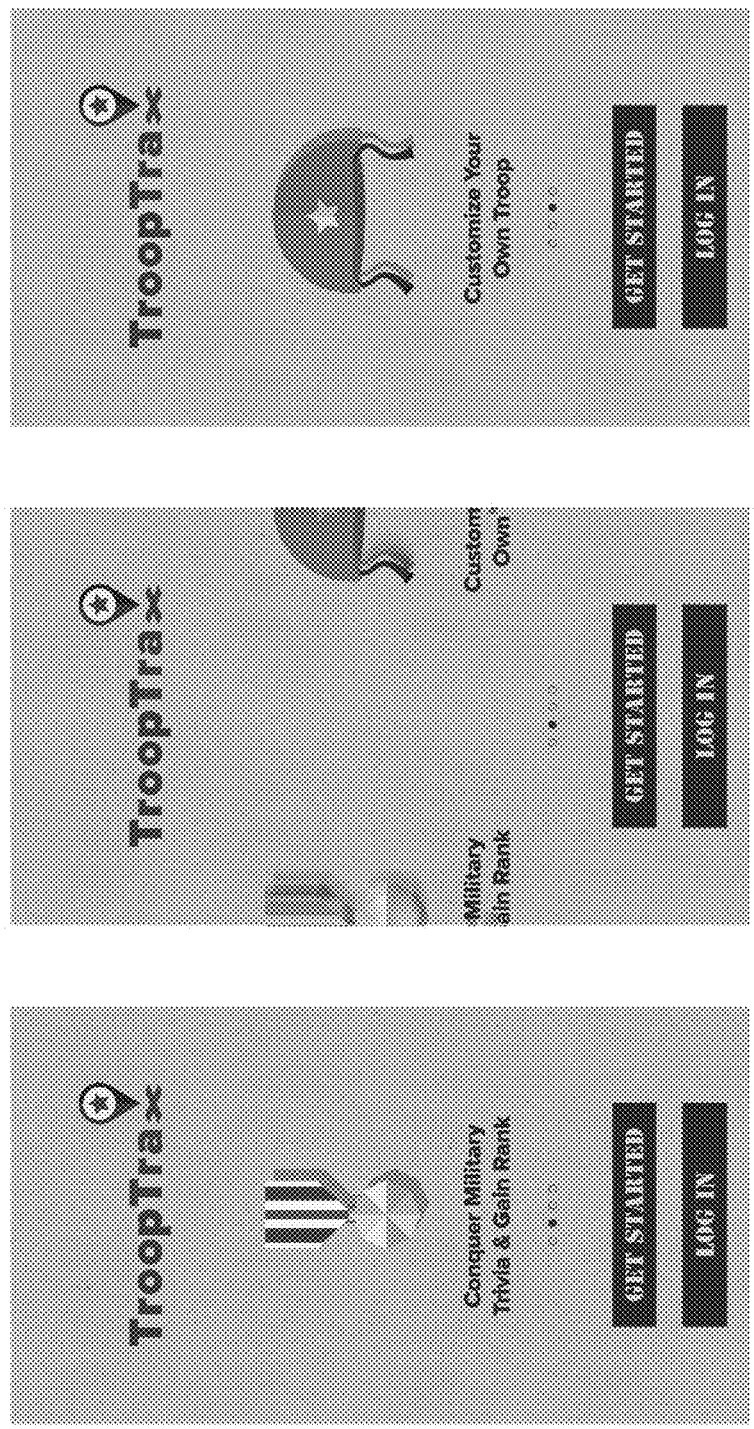
Figure 8:
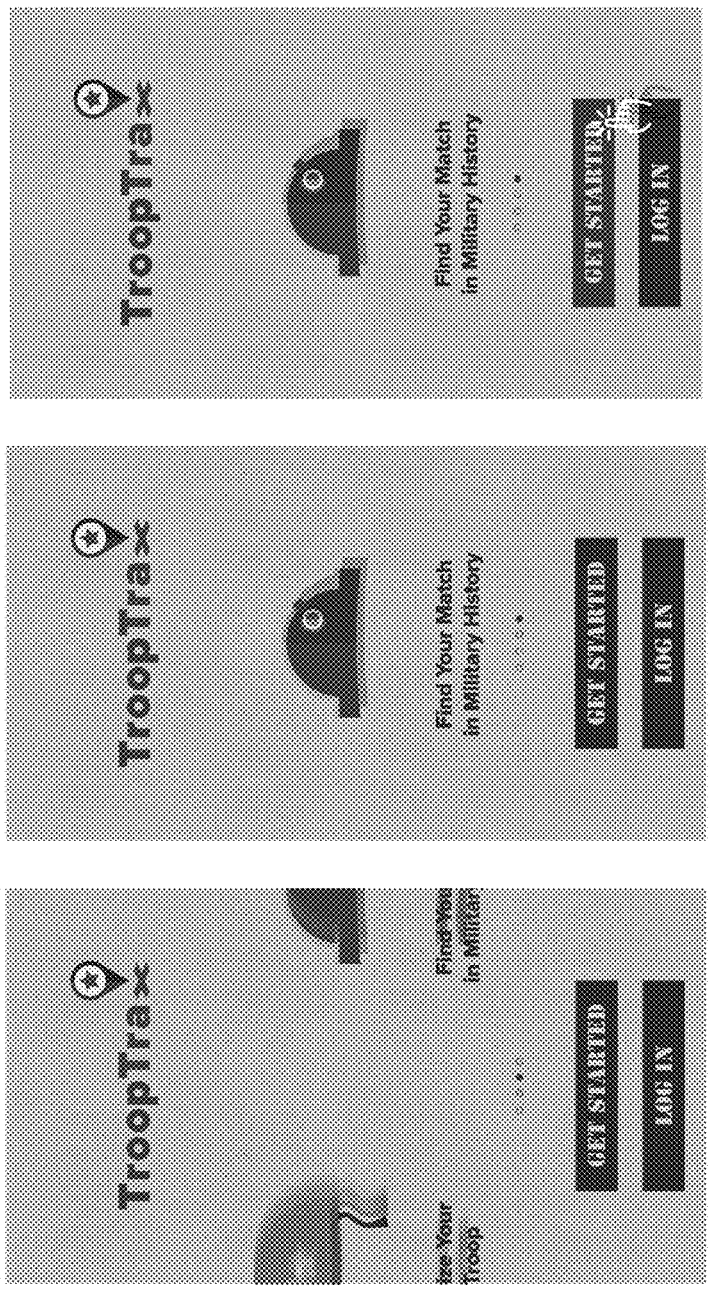
Figure 9:
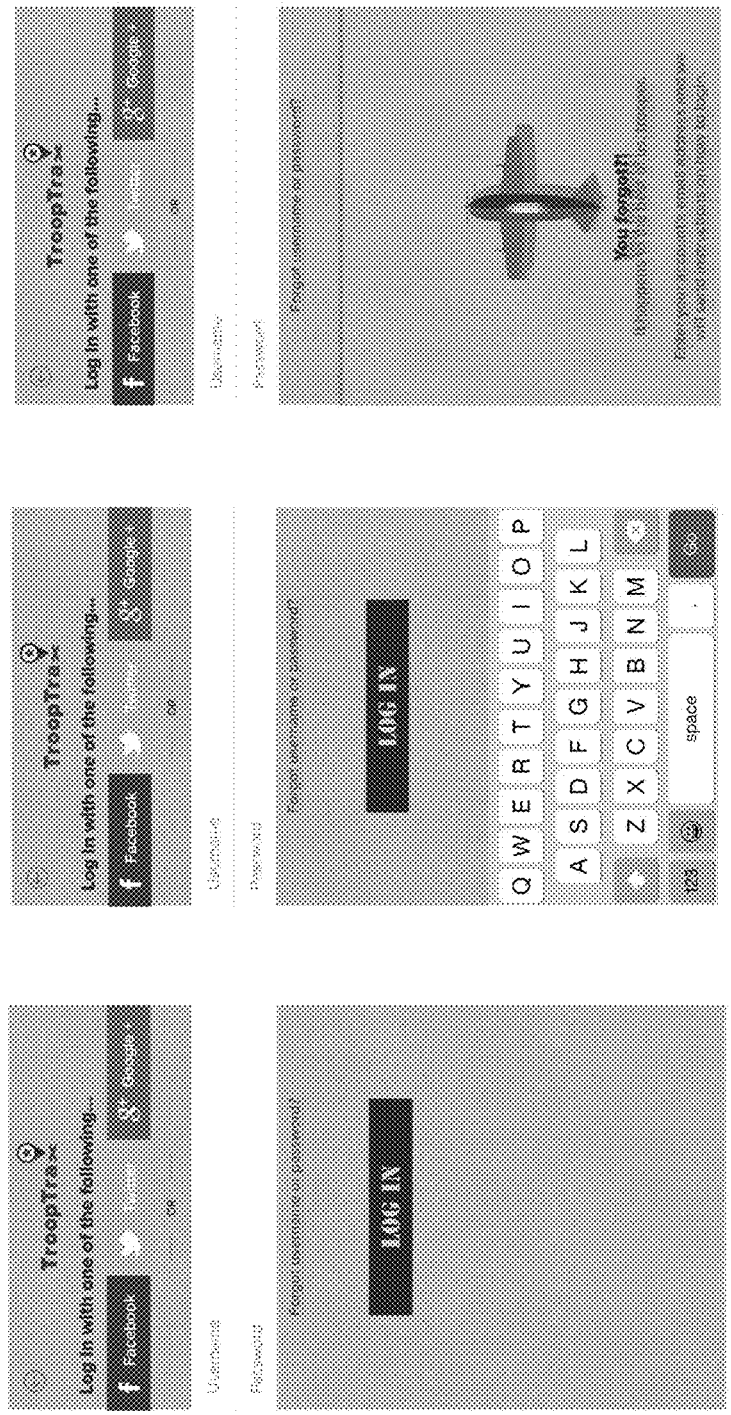
Figure 10:
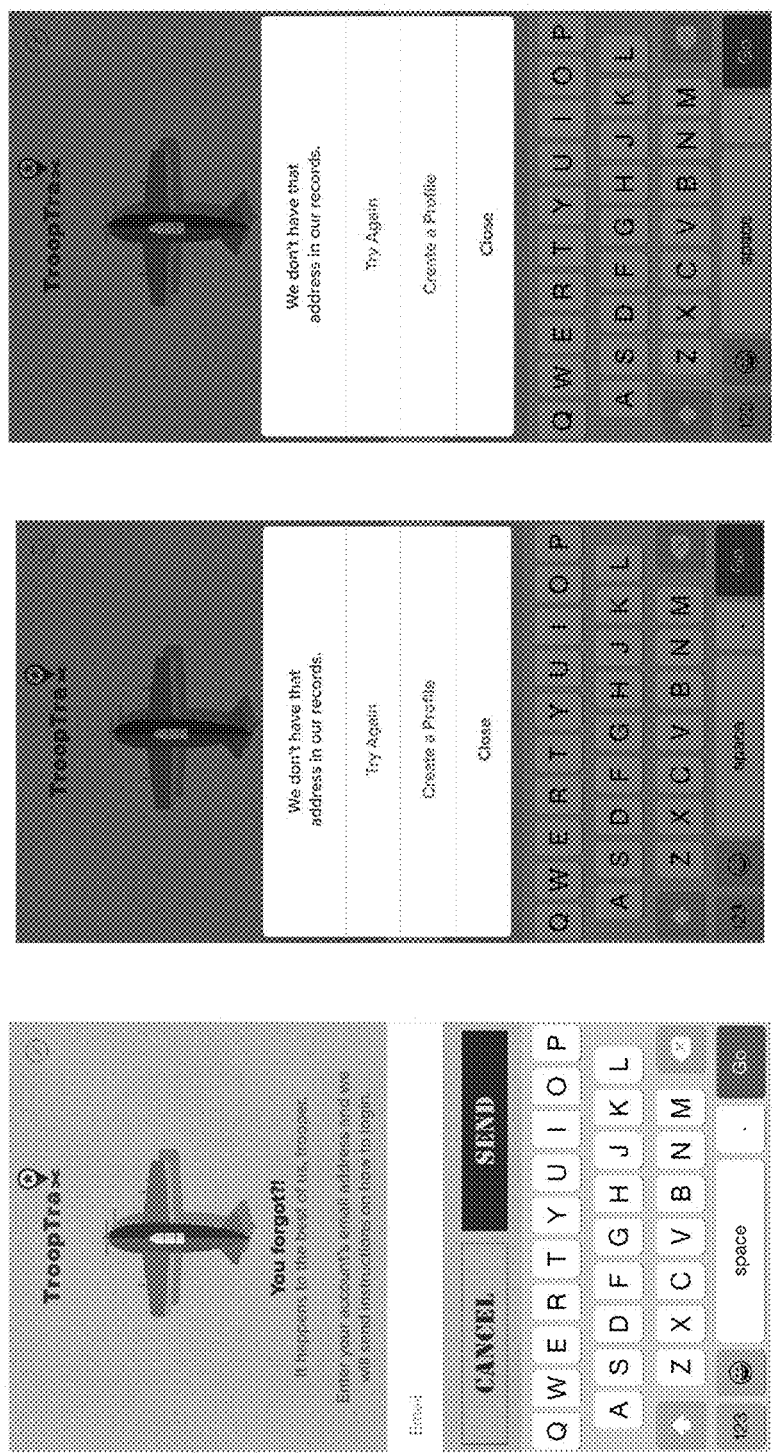
Figure 11:
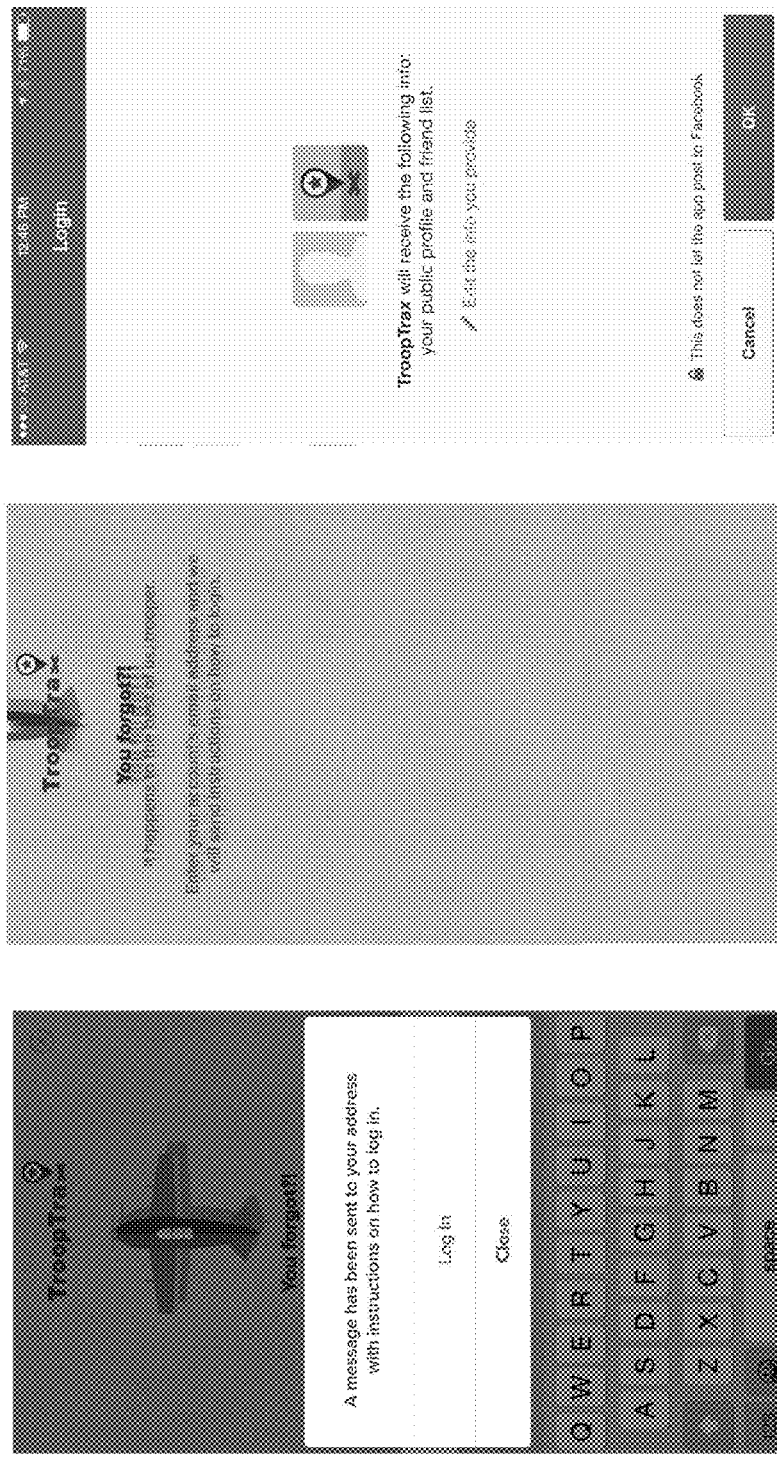
Figure 12:
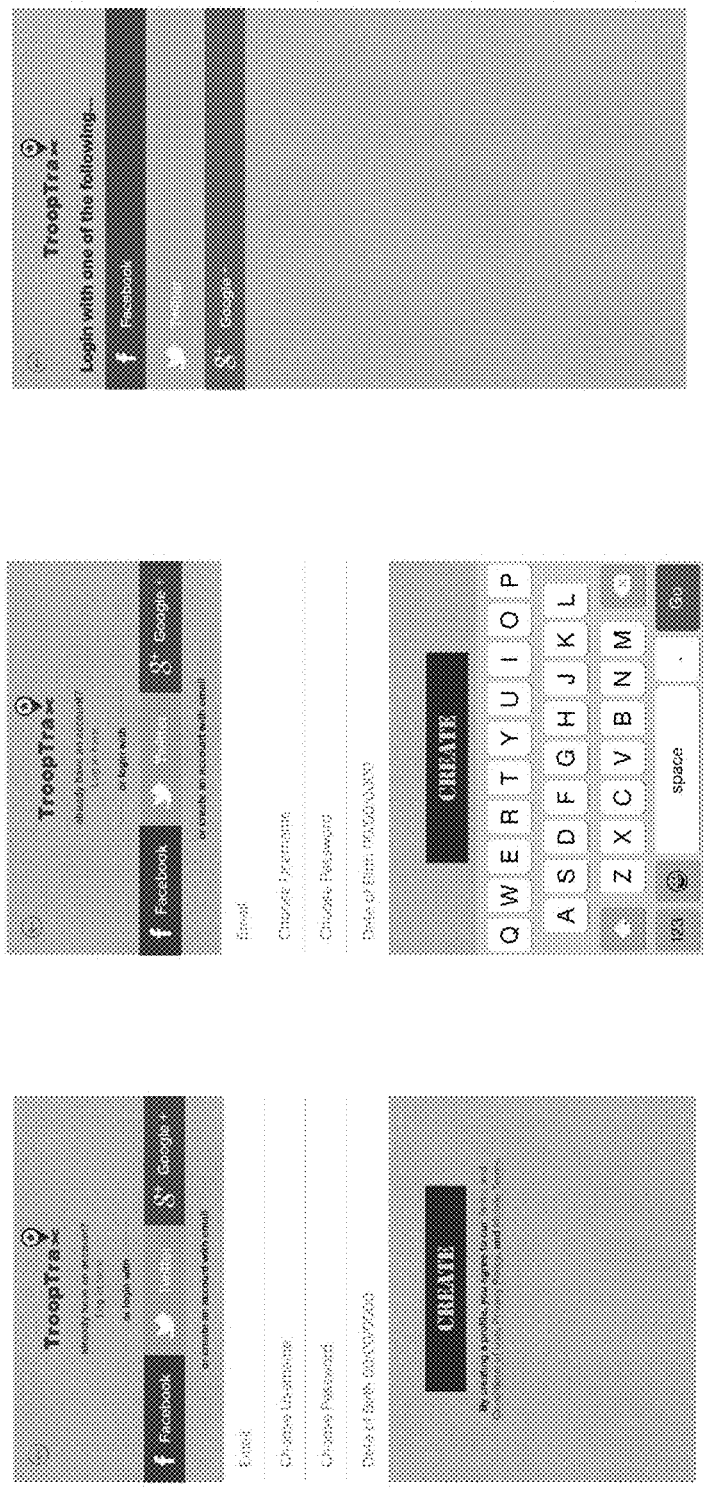
Figure 13:
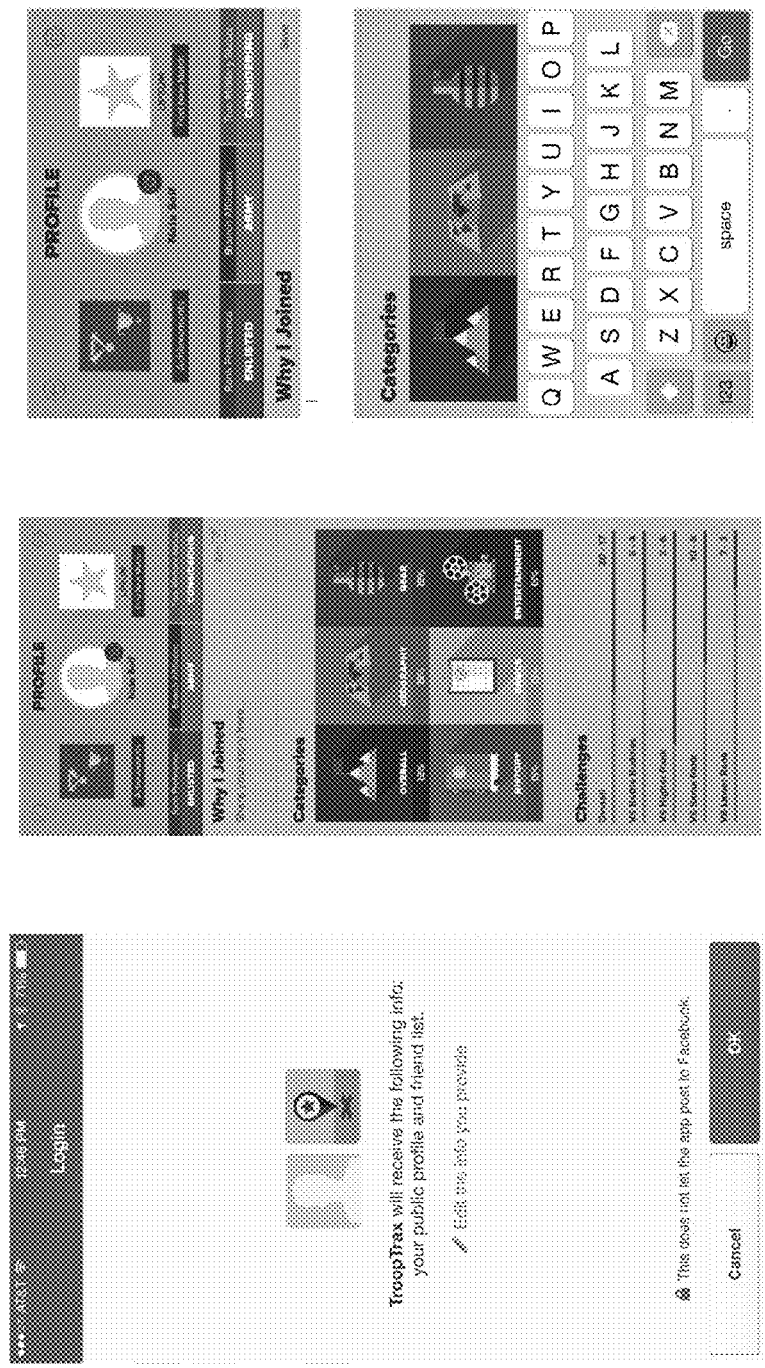
Figure 14:
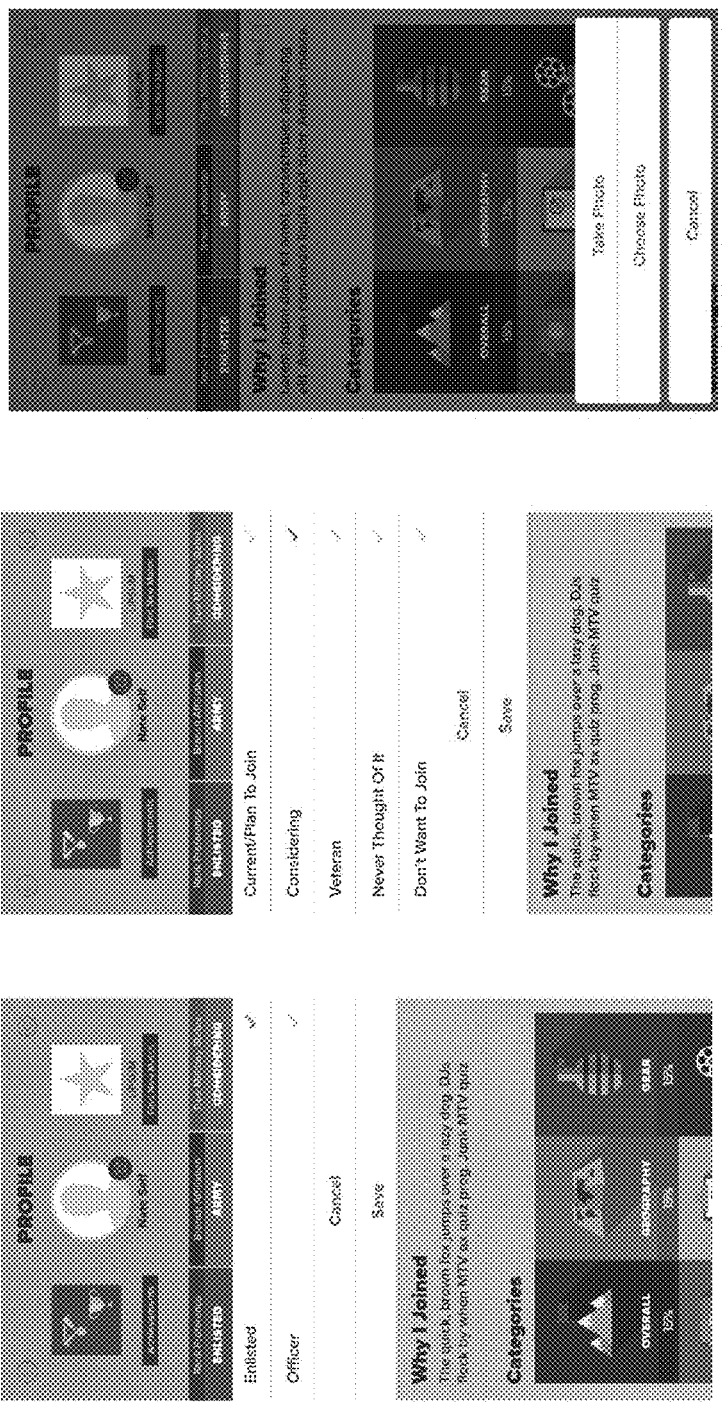
Figure 15:
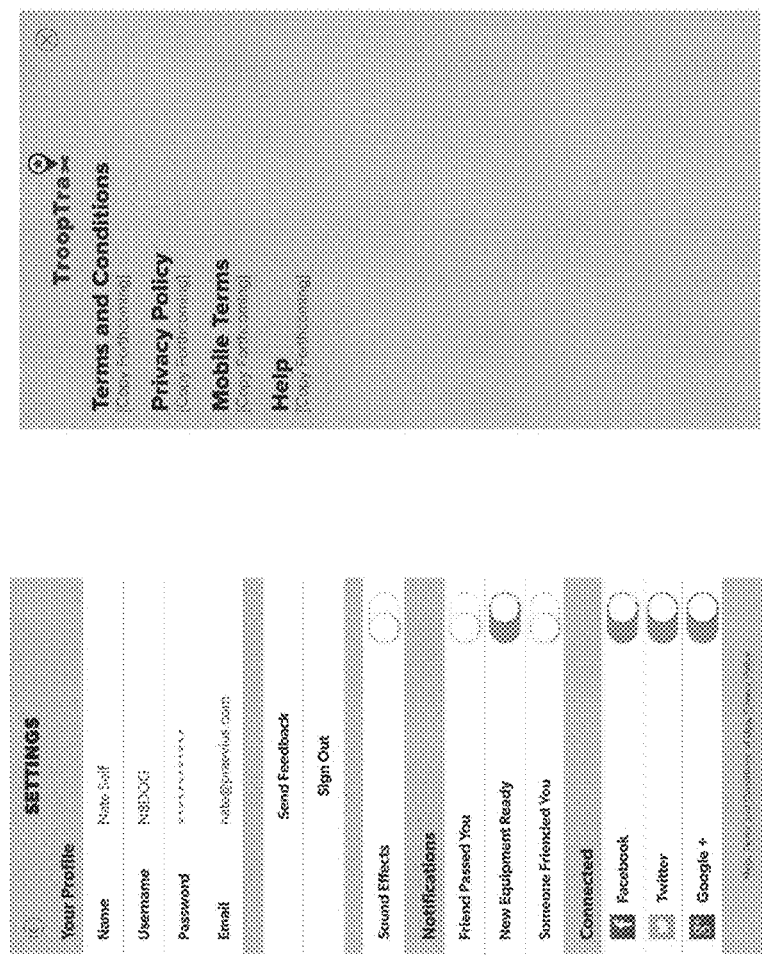
Figure 16:

FIGS. 4-5 depict flowcharts illustrating sets of operations. In some embodiments, fewer than all of the operations in each set of operations are performed, whereas in other embodiments additional operations are performed. Moreover, in some embodiments, the operations may be performed in different orders or in parallel. The operations can be performed by various components of computing devices 110 and/or gamification platform 120 such as those illustrated in FIG. 2 and/or FIG. 3.

FIG. 4 is a flowchart illustrating a set of operations of a process 400 for tracking actions taken by a user via a gaming application running on a user's device. In some embodiments, the operations in FIG. 4 can be performed by a server remotely located form the user's device and coupled to the gamification platform 120. In some embodiments, actions taken by a user can be completed or performed by the user at a third party computer. In some embodiments, the third party computer can be owned and operated by the same entity that operates the gamification platform 120.

Receive operation 402 receives information relating to user interaction with a gaming application running on a user's device 110. Decision operation 404 determines if the user has reached a predetermined level in the game. If decision operation 404 determines that the user has not reached a predetermined level in the game, then the decision operation 404 loops back to receive operation 402. If decision operation 404 determines that the user has reached a predetermined level in the game, then decision operation 404 branches to communicate operation 406 in which a pause signal is communicated to the gaming application to cause a temporary halt in the progress of the gaming application (e.g., a quest, question/answer session).

Transmit operation 408 transmits a message relating to an action, such as clicking a clickable link to the gaming application. The clickable link can be associated with one or more actions to be performed by the user at a third party computer. Receive operation 410 receives an indication from the gaming application that the user has selected the clickable link. Upon detecting that the user has completed the one or more actions, remove operation 412 removes the pause signal and activates the gaming application. In some embodiments, detecting that the user has completed the one or more actions includes receiving verification information from the third party computer relating to completion of the one or more actions by the user (e.g., watched a video indicated by the link). In response to receiving verification information from the third party computer relating to the completion of the one or more actions by the user, gamification platform 120 communicates a resume signal to the gaming application. The resume signal removes the temporary halt in the progress of the gaming application. Hence, activating the gaming application can include communicating the resume signal.

FIG. 5 is a flowchart illustrating a set of operations of a process 500 performed by a gaming application running on a user's computing device. Monitor operation 502 monitors interactions of a user with the gaming application. Detect operation 504 detects that the user has reached a predetermined gaming level in the gaming application based on the monitored user interactions. Decision operation 506 determines whether or not the user has reached a predetermined gaming level in the gaming application. If decision operation 506 determines that the user has not reached a predetermined gaming level, then decision operation 506 loops back to step 502. If decision operation 506 determines that the user has reached a predetermined gaming level, then decision operation 506 branches to pause operation 508 which causes a pause in the progress of the gaming application. Display operation 510 causes display of a clickable link to the user, the clickable link associated with one or more actions to be performed by the user at a third party computer. Detect operation 512 detects that the user selected the clickable link. Communicate operation 514 communicates an indication (to gamification platform 120) that the user has selected the clickable link. Receive operation 516 receives an activation signal from gamification platform 120 relating completion of the one or more actions by the user. In some embodiments, the link is a link to an account and the action is to deposit a certain amount of money into a second account of the user.

FIGS. 6-16 depict various screenshots of a gaming application in accordance with various embodiments of the present disclosure.

Computer System Overview

Figure 17:
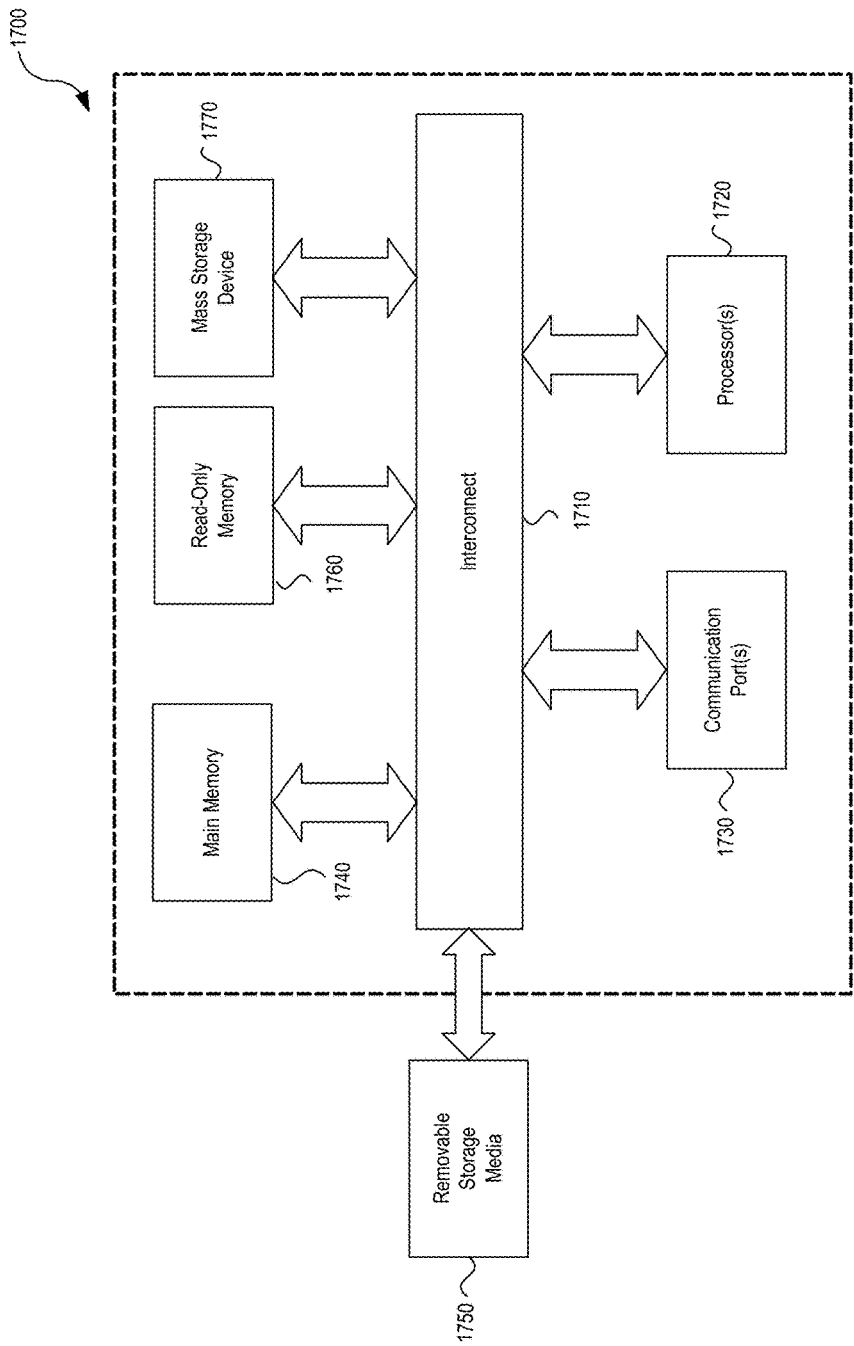
FIG. 17 illustrates an example of a computer system with which some embodiments of the present disclosure may be utilized.

Embodiments of the present disclosure include various steps and operations, which have been described above. A variety of these steps and operations may be performed by hardware components or they may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 17 is an example of a computer system 1700 with which embodiments of the present disclosure may be utilized. According to the present example, the computer system includes an interconnect 1710, at least one processor 1720, at least one communication port 1730, a main memory 1740, a removable storage media 1750, a read-only memory 1760, and a mass storage device 1770.

Processor(s) 1720 can be any known processor, such as, but not limited to, Intel® Itanium® or Itanium 2® processor(s), or AMD® Opteron® or Athlon MP® processor(s), or Motorola® lines of processors. Communication port(s) 1730 can be any of an RS-232 port for use with a modem-based dialup connection, a 10/100 Ethernet port, or a Gigabit port using copper or fiber. Communication port(s) 1730 may be chosen, depending on a network such as a Local Area Network (LAN), Wide Area Network (WAN), or any network to which the computer system 1700 connects.

Main memory 1740 can be random access memory (RAM) or any other dynamic storage device(s) commonly known in the art. Read-only memory 1760 can be any static storage device(s), such as programmable read-only memory (PROM) chips for storing static information, such as instructions for processor(s) 1720.

Mass storage device 1770 can be used to store information and instructions. For example, hard disks such as the Adaptec® family of SCSI drives, an optical disc, an array of disks such as RAID, the Adaptec family of RAID drives, or any other mass storage devices may be used.

Interconnect 1710 communicatively couples processor(s) 1720 with the other memory, storage, and communication blocks. Interconnect 1710 can be a PCI/PCI-X- or SCSI-based system bus, depending on the storage devices used.

Removable storage media 1750 can be any kind of external hard drives, floppy drives, USB drives, IOMEGA® Zip Drives, compact disc-read-only memory (CD-ROM), compact disc-re-writable (CD-RW), or digital video disc-read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states that a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communication between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for tracking of a user's actions performed at third party computers and facilitating users to play games via a gaming application on their devices. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable medium comprising a set of instructions that, when executed by one or more processors, cause a machine to perform the operations of:
   receiving, at a server, information relating to interactions of a user with a gaming application, the gaming application running on a device of the user remote from the server;
   receiving, from the gaming application, registration information identifying the user;
   assigning the user to one or more user categories based at least in part on the registration information;
   in response to determining, based on the information relating to the interactions of the user with the gaming application, that the user has reached a predetermined gaming level in the gaming application:
      communicating a pause signal to the gaming application, the pause signal causing a temporary halt in a progress of the gaming application,
      transmitting a clickable link to the gaming application, the clickable link associated with one or more actions to be performed by the user at a third party computer,
      receiving, from the gaming application, an indication that the user has selected the clickable link, and
      upon detecting that the user has completed the one or more actions, removing the pause signal and activating the gaming application.

2. The non-transitory computer-readable medium of claim 1, wherein the third party computer is associated with a bank or a financial institution and the one or more actions includes the user selecting a transfer of funds into a deposit account of the user maintained by the bank or the financial institution.

3. The non-transitory computer-readable medium of claim 1, wherein the third party computer is associated with an insurance provider and the one or more actions includes the user viewing multimedia content provided by the insurance provider.

4. The non-transitory computer-readable medium of claim 1, wherein the set of instructions, when executed by the one or more processors, further cause the machine to perform the operations of:

transmitting a set of questions and answers to the gaming application, the set of questions and answers relating to topics in the military and armed forces.

5. The non-transitory computer-readable medium of claim 4, wherein communicating the pause signal to the gaming application is in response to receiving, from the user, a predetermined number of incorrect responses to one or more questions in the set of the questions and the answers relating to the topics in the military and armed forces.

6. The non-transitory computer-readable medium of claim 1, wherein detecting that the user has completed the one or more actions includes receiving verification information from the third party computer relating to completion of the one or more actions by the user.

7. The non-transitory computer-readable medium of claim 1, wherein the set of instructions, when executed by the one or more processors, further cause the machine to perform the operations of:
in response to receiving verification information from the third party computer relating to the completion of the one or more actions by the user, communicating a resume signal to the gaming application, the resume signal removing the temporary halt in the progress of the gaming application.

8. The non-transitory computer-readable medium of claim 1, wherein the one or more actions to be performed by the user are trackable by the machine in real time or almost real time.

9. A computer-implemented method implemented by a gaming application, the method comprising:
monitoring interaction of a user with the gaming application running on a device associated with the user,
wherein the gaming application receives, from a remote server, a set of questions and answers relating to topics in the military and armed forces;
based on the interactions of the user with the gaming application, detecting that the user has reached a predetermined gaming level in the gaming application; and
in response to detecting that the user has reached the predetermined gaming level in the gaming application:
pausing a progress of the gaming application,
causing display of a clickable link to the user, the clickable link associated with one or more actions to be performed by the user at a third party computer,
detecting that the user selected the clickable link,
communicating, to the remote server, an indication that the user has selected the clickable link, and
receiving an activation signal from the remote server relating to completion of the one or more actions by the user.

10. The method of claim 9, further comprising:
upon receiving the activation signal from the remote server relating to completion of the one or more actions by the user, resuming the progress of the gaming application.

11. The method of claim 10, wherein resuming the progress of the gaming application is in response to receiving a resume signal from the remote server, the resume signal removing a temporary halt in the progress of the gaming application.

12. The method of claim 9, wherein pausing the progress of the gaming application is in response to receiving a pause signal from the remote server, the pause signal causing a temporary halt in the progress of the gaming application.

13. The method of claim 9, wherein causing the display of the clickable link to the user is in response to receiving the clickable link from the remote server.

14. The method of claim 9, further comprising:
causing display of a first question in the set of questions and answers;
determining, based on an accuracy of responses of the user to the displayed first question, an aptitude level of the user;
dynamically selecting a second question in the set of questions and answers based on the aptitude level of the user; and
causing display of the second question in the set of questions and answers to the user.

15. The method of claim 9, wherein pausing the progress of the gaming application is in response to receiving, from the user, a predetermined number of incorrect responses to one or more questions in the set of the questions and the answers relating to the topics in the military and armed forces.

16. A system comprising:
a gaming application running on a device associated with a user that is in electronic communication with a remote server, wherein the gaming application is configured for:
receiving, from the remote server, a set of questions and answers relating to topics in the military and armed forces,
monitoring interactions of the user with the gaming application running on the device associated with the user,
based on the interactions of the user with the gaming application, detecting that the user has reached a predetermined gaming level in the gaming application, and
in response to detecting that the user has reached the predetermined gaming level in the gaming application:
pausing a progress of the gaming application,
causing display of a clickable link to the user, the clickable link associated with one or more actions to be performed by the user at a third party computer,
detecting that the user selected the clickable link,
communicating, to the remote server, an indication that the user has selected the clickable link, and
receiving verification information from the remote server relating to completion of the one or more actions by the user; and
the remote server in electronic communications with the gaming application and the third party computer, wherein the remote server is configured for:
receiving information relating to the interactions of the user with the gaming application, and
in response to determining, based on the information relating to the interactions of the user with the gaming application, that the user has reached the predetermined gaming level in the gaming application:
communicating a pause signal to the gaming application, the pause signal pausing the progress of the gaming application,
transmitting the clickable link to the gaming application,
receiving, from the gaming application, an indication that the user has selected the clickable link, and
upon detecting that the user has completed the one or more actions, removing the pause signal and activating the gaming application.

17. The system of claim 16, wherein pausing the progress of the gaming application is in response to receiving, from the user, a predetermined number of incorrect responses to one or more questions in the set of the questions and the answers relating to the topics in the military and armed forces.

* * * * *